United States Patent [19]

Brandenstein et al.

[11] Patent Number: 4,489,992
[45] Date of Patent: Dec. 25, 1984

[54] SELF-ALIGNING BEARING

[75] Inventors: Manfred Brandenstein, Eussenheim; Horst M. Ernst, Eltingshausen; Lothar Walter, Schweinfurt; Karl-Friedrich Kaschube, Niederwerrn, all of Fed. Rep. of Germany

[73] Assignee: SKF Kugellagerfabriken GmbH, Schweinfurt, Fed. Rep. of Germany

[21] Appl. No.: 312,895

[22] Filed: Oct. 19, 1981

[30] Foreign Application Priority Data

Oct. 18, 1980 [DE] Fed. Rep. of Germany ....... 3039422
May 23, 1981 [DE] Fed. Rep. of Germany ....... 3120608

[51] Int. Cl.³ .................. F16C 23/08; F16C 27/00; F16C 35/07
[52] U.S. Cl. .................................... 384/496; 384/536
[58] Field of Search ............ 308/184 R, 184 A, 187.1, 308/187.2, 189 R, 207 R, 216, 238, 236, 26; 277/37

[56] References Cited

U.S. PATENT DOCUMENTS

| | | | |
|---|---|---|---|
| 2,062,290 | 12/1936 | Bott | 308/184 R |
| 2,173,250 | 9/1939 | Fay | 308/184 R |
| 2,473,267 | 6/1949 | Wightman | 308/236 |
| 2,757,988 | 8/1956 | Lecourbe | 308/187.1 X |
| 3,519,316 | 7/1970 | Göthberg | 308/187.2 X |
| 3,625,575 | 12/1971 | Darnell | 308/6 R X |
| 3,885,840 | 5/1975 | Neder | 308/236 X |
| 3,904,008 | 9/1975 | Sonnerat | 308/26 X |

Primary Examiner—John M. Jillions
Assistant Examiner—Thomas R. Hannon
Attorney, Agent, or Firm—Daniel M. Rosen

[57] ABSTRACT

A self aligning bearing structure, especially adapted for electric motors, has an outer ring with a plastic jacket thereon. A housing for supporting a bearing has a cylindrical seat for receiving the outer ring. The plastic jacket has one annular central ridge of greater diameter, in the unassembled condition, than the seat, so that the annular ridge is compressed to substantially the compression limit when the outer ring is assembled in the seat. The plastic jacket may have a conical end to simplify assembly.

17 Claims, 6 Drawing Figures

SELF-ALIGNING BEARING

BACKGROUND OF THE INVENTION

This invention relates to a self-aligning bearing, wherein two bearings, such as rolling element bearings, are mounted to be spaced apart on a shaft. In one form of bearing arrangement of this type, the outer ring of the bearing has a radially outer coating of plastic material and is adapted to be received in a bearing seat in a housing or the like.

DESCRIPTION OF THE PRIOR ART

One bearing of this type is disclosed for example in DE-OS No. 1,613,227, the arrangement of this reference having a ball bearing. A separately formed plastic element is mounted over the bearing, and is adapted to be received in a conical recess in the bearing seat.

While this arrangement enables alignment of the bearing in the conical surface, it has a major disadvantage in operation, since it does not provide an adequately firm seat for the bearing in the bearing holder. Only a single axially acting spring element is provided to press the bearing against the conical seating surface. As a consequence the motor shaft can yield in the axial direction. The bearing can therefore become displaced from its seating surface, leading to the shutdown and stoppage of the motor. This problem can be solved only in part by the provision of a very strong spring bias element, since this solution results in very high friction load due to the extremely high axial bias on the bearing. In addition, this type of bearing structure is very expensive.

BRIEF DESCRIPTION OF THE INVENTION

The present invention is therefore directed to the provision of a bearing arrangement of the above type wherein the bearing is adequately held in its seat in the housing, automatic alignment is assured in the radial and axial directions, and in addition the cost of the bearings is also reduced.

Briefly stated, in accordance with the invention, a jacket of plastic material is affixed to the radial outer surface of the outer ring, the plastic material being of a yielding elastic material. The plastic jacket has an annular radially extending ridge with a greater outer diameter than the remainder of the radial outer surface of the plastic jacket and the bearing seat in the housing is cylindrical.

The annular ridge is so dimensioned that upon forcing the outer ring in the cylindrical bore of the housing or the like, the jacket is radially compressed close to its compression limit. The remainder of the plastic jacket merely lies against the seating surface, or is deformed to a small extent. Due to the essentially rounded cross section of the annular ridge, which furthermore engages an annular region on a part of the seating surface with high pressure, alignment of the respective bearing is possible, i.e. the angular movement with respect to the axis. The annular ridge thereby effects a rolling movement within the compressed material, without losing its tight engagement with the seating surface, so that the material part is only shifted. The radial position of the bearing, however, advantageously remains fixed, since elastic movement beyond the compression limit is not possible, or is only possible with extremely high forces. The laterally limiting, elastic jacket portion of the jacket, adjacent the ridge, has a stabilizing action on the annular ridge, since it inhibits the high expansion forces acting in the annular ridge from causing oblique positioning of the bearing. Due to the limited displacement of the annular ridge with respect to the laterally adjoining cylindrical jacket, the free acting movement of the bearing likewise can serve as ball and socket joint, even though it has a radially fixed seat. An adequately firm seat in the axial direction is thereby obtained in the bearing arrangement in accordance with the invention, since axial movement of the annular ridge does not cause angular movements with respect to its axis, as above discussed, but only forces the ridge in one or the other axial direction. The annular ridge and the laterally adjacent jacket portions resist such movement. Advantageously, this does not change the radial position of the bearing.

In accordance with another embodiment of the invention the plastic coating adjoining the annular ridge on at least one side of the outer ring is conical, with a diameter that diminishes toward the respective side of the outer ring. The conical shape of the plastic coating simplifies the forcing of the outer ring in the cylindrical bore of the housing or the like, so that in most cases the assembly is possible solely by the application of axial presure and the use of some lubricant.

According to a further feature of the invention the plastic jacket has a substantially radially inwardly directed annular lip on at least one side thereof, completely or in part embracing the outer ring, and arranged to form a seal with one surface of the inner ring. The corresponding side of the bearing is thereby sealed in a simple manner, so that either a sliding seal or a non-sliding seal may be provided. The annular sealing lips can be made to be harder of softer than the main portion of the plastic jacket by known plastic processing techniques. In this example of the invention the plastic jacket and the sealing bearing can be produced without any substantial additional expense.

In a preferred embodiment of the invention the plastic jacket has axially projecting knobs distributed about its circumference. The outer ring is elastically supported against a radially extending surface of the bearing seat by these knobs, for example against the shoulder of the bearing seat in the housing or the like. The bearing can consequently align itself in a larger region since it is possible to select the number and size of the knobs to match each application of the bearing.

In another embodiment of the invention the plastic jacket has a radially inwardly open groove in a projection extending axially beyond at least one side surface of the outer ring for receiving a sealing element or the like. Due to the hardness of the projecting material of the plastic jacket, a sealing element, for example, of metal can be snapped in the assembly of the bearing. The inner rim of the sealing element is so constructed that it forms a sealing gap with the inner ring of the bearing. It is however also possible to use commercial sealing rings with a sealing lip running on the inner ring.

In accordance with a further feature of the invention a fixed connection is provided between the outer ring and the plastic jacket by injection molding, Vulcanizing, gluing or the like. A fixed connection is provided between the metallic outer ring and the plastic jacket by the use of these various processes, so that, for example, as further described above, a self-aligning element sealed on both sides is provided with a minimum number of manufacturing operations.

In accordance with a still further feature of the invention the plastic jacket is formed of several parts and the annular ridge is formed by an "O"-ring inserted in the plastic jacket. In this arrangement distinct and sharply demarcated hardness zones can be produced, so that the respective bearing can be aligned especially easily in a fixed radial seat.

In an especially advantageous embodiment of the bearing in accordance with the invention, especially for electric motors, the bearing is in the form of an angular contact ball bearing with at least one bearing of sheet metal. In this case, for example, the inner ring may be made in a conventional manner as a massive element, so that the bearing meets requirements of high quality operation, the outer ring can be prepared in a non-cutting manner from sheet metal, since it automatically aligns itself with the axis of the running shaft by means of the plastic jacket in the receiving bore of the housing or the like. Consequently it is not necessary to machine the seating surfaces in the conventional manner, i.e., the outer surface and the side surfaces. Although the angular contact ball bearing can be produced at an extremely moderate price, the finished bearing has the precision of bearings produced by expensive techniques.

In a still further embodiment of the invention, an elastic holding ring for the rolling bodies is provided formed on the plastic jacket on at least one side surface of the outer ring, and projecting inwardly in the region of the race.

According to another embodiment of the invention holding rings can be provided on one or both sides of the bearing. In an angular contact ball bearing, for example, the plastic jacket extends axially from one side surface of the outer ring to the region of the race, so that the rolling bodies can thereby be prevented from falling radially inwardly from the race. In a similar manner a radially inwardly extending holding ring is provided on the other side surface of the outer ring, which likewise is formed in the plastic jacket and prevents the rolling bodies from falling from the race in the axial direction. These functions can however alternatively be served by a sealing element or sealing lip, as described above. The holding flanges are elastically yielding and are so dimensioned or arranged that the rolling bodies can be easily snapped in the outer ring in the assembly of the bearing.

In another feature of the invention the holding rings are arranged to be at a distance from the rolling bodies in the assembled bearing The rolling bodies will actually be advantageously supported in the incomplete inner ring by the holding ring. They will, however, be moved into their proper running position by the insertion of them in the inner ring or the like, so that in use the rolling bodies do not engage the holding ring and thereby advantageously can roll without additional friction.

In another embodiment of the invention the holding rings are provided with circumferentially distributed axially extending slits.

The holding ring is thus divided into individual sections by the slits, whereby an improved elastic yieldability is insured in the snapping in of the rolling bodies. The number of slits can be selected in accordance with the desired characteristics of each bearing.

In the bearing arrangement in accordance with the invention, especially due to the special construction of the plastic jacket, an arrangement is provided which is distinguished by its requiring minimum expense in its production and installation.

DESCRIPTION OF THE DRAWINGS

In order that the invention will be more clearly understood, it will now be disclosed in greater detail with preference to the accompanying drawings, wherein.

DETAILED DESCRIPTION OF THE PREFERRED EMBODIMENT

Figure 1A:
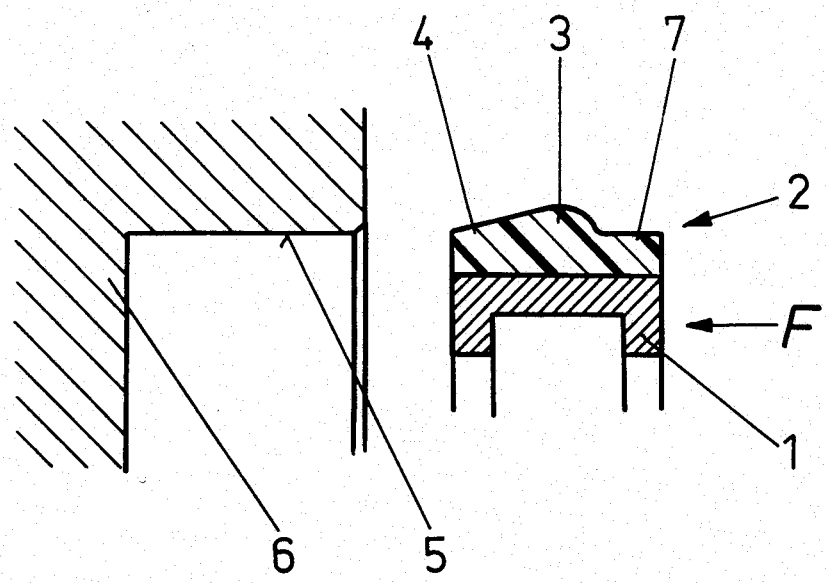
FIG. 1a is a cross-sectional view of a section of an outer ring of a rolling bearing having a plastic jacket in accordance with the invention, before its assembly.
Figure 1B:
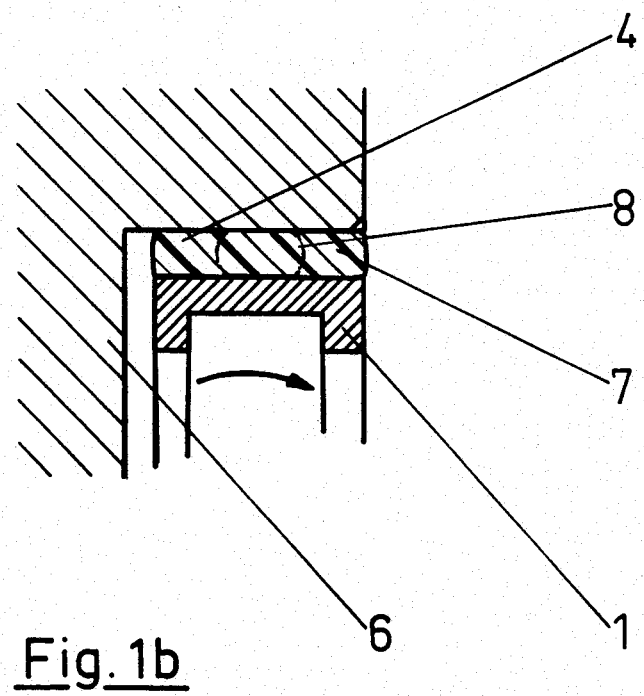
FIG. 1b illustrates the outer ring of FIG. 1a after the assembly thereof.

Referring now to the drawings, the outer ring 1 of a rolling bearing illustrated in FIG. 1a, is covered by an elastic plastic jacket 2. The axial center of the plastic jacket 2 is provided with an annular ridge 3 having an outer diameter greater than the remainder of the jacket. One end of the plastic jacket 2 is conical with a diameter that diminishes toward one side surface of the rolling bearing. In assembly of the outer ring in the cylindrical bore 5 of a housing 6 or the like, the conical shaped starting region 4, whose outer diameter is only slightly smaller than the diameter of the bore 5 in the housing 6, is first inserted into the bore 5. By axial pressure against the outer ring, and with some lubricant on the plastic jacket, the elastic material is partly deformed by the bore surface and is partially radially compressed. In the region of the annular ridge 3 a large material volume is compressed, while the following cylindrical jacket part 7 has essentially the same diameter as the bore 5 in the housing 6 and is not compressed. As is evident in FIG. 1b, there is an annular intermediate region between the outer ring 1 and the housing 6 which forms a very tight seal extending through the middle of the region 8, the compression being close to the compression limit, while both sides of the regions 4, 7 extending from the two sides of the region 8 are sealed only to a small extent or not at all.

If the outer ring 1 of the rolling bearing is forced into alignment with the axis of the shaft and for this purpose must move, for example, in the direction of the arrow with respect to the housing 6, the greatly compressed zone 8 executes a rolling movement, while the lateral regions 4 and 7 are only slightly elastically deformed. Due to the presence of the strongly compressed region, the outer ring 1 is held substantially fixed in the radial direction.

Figure 2:
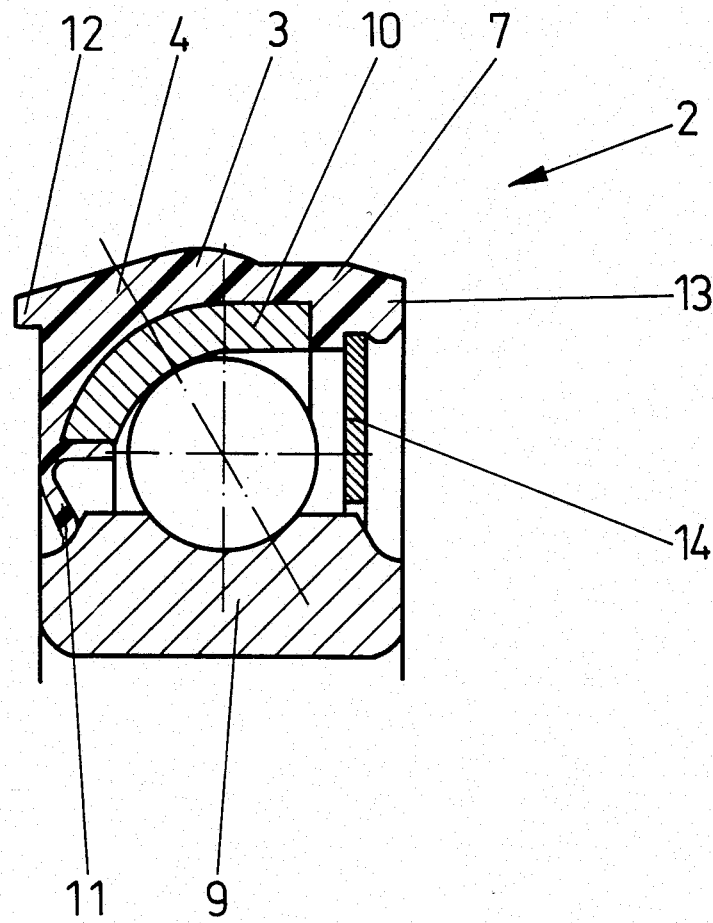
FIG. 2 is a cross-sectional view of a portion of an angular contact ball bearing sealed on both sides and having a plastic jacket, in accordance with another embodiment of the invention.

FIG. 2 illustrates an angular contact ball bearing with a massive inner ring 9 and an outer ring 10 of sheet metal. A plastic jacket 2 of pliable plastic material is molded about the outer ring 10, and, as in the arrangement of FIGS. 1a and 1b, an annular ridge 3 and a conical portion 4 are provided on the jacket 2. On one side of the outer ring 10 the plastic jacket 2 extends radially inwardly to form a sealing lip 11, the lip forming a seal with a surface of the inner ring 9. Circumferentially distributed axially projecting knobs 12 are formed on this side surface of the plastic jacket 2. On the other side of the outer ring the plastic jacket 2 extends axially, and has an annular groove 13 in its radial inner surface for receiving a sealing element such as an annular seal 14.

Figure 3:
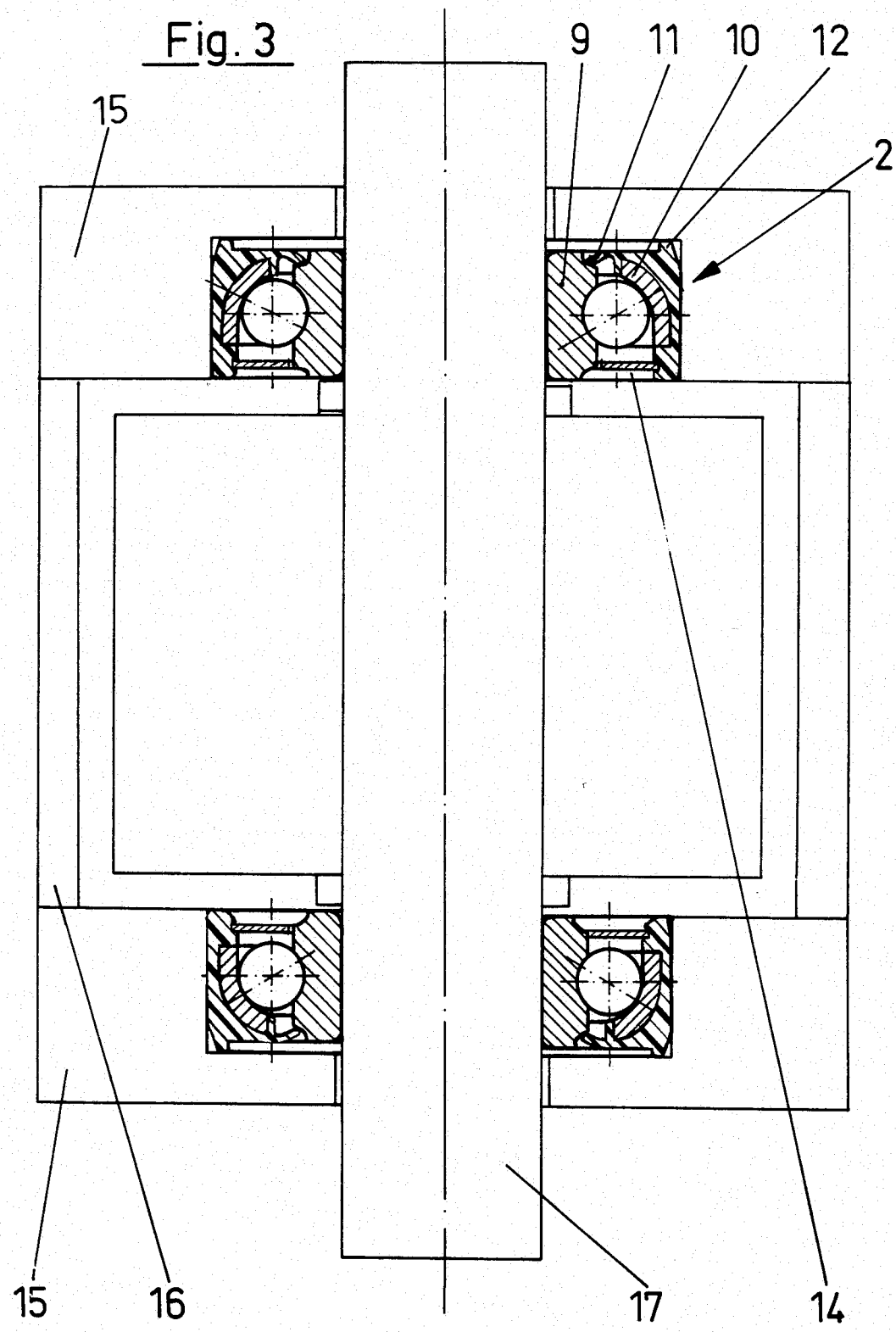
FIG. 3 is a cross-sectional view of a bearing arrangement on a shaft with two angular contact ball bearings.

As illustrated in FIG. 3, a shaft 17 is rotatably supported in a housing (not illustrated) (FIG. 1a) by means of two of the angular contact ball bearings of the type illustrated in FIG. 2. The housing consists essentially of two bearings 15 which are affixed to a housing cover 16 after the assembly thereof. Due to the production tolerances of the individual parts, misalignment between the cylindrical bores 5 (shown in FIG. 1a) of the two outer rings 10 of the angular contact ball bearings is possible. In order to insure, nevertheless, the satisfactory running of the shaft, the outer ring 1 is aligned by the plastic jacket 2 as discussed above.

Figure 4:
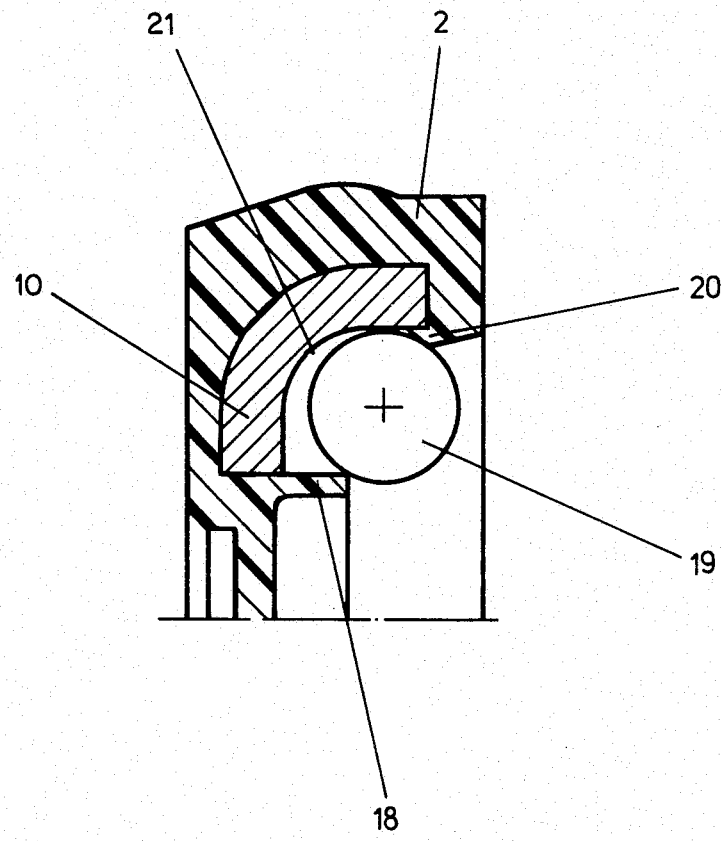
FIG. 4 is a sectional view of the outer ring of an angular contact ball bearing with two holding rings, in accordance with the invention.

The outer ring 10 of the angular contact ball bearing for a self-alignment bearing, as illustrated in FIG. 4, is surrounded by a plastic jacket 2. The plastic jacket 2 extends radially inwardly from one of the side surfaces around the outside of the outer ring 10, and thence axially, extending into the bearing inner space, to form a holding ring 18 for the balls 19. A second holding ring is provided on the other side surface, comprised of a radially inwardly directed projection portion that terminates in a holding ring 20 against the cylindrical inner section of the race 21. Both of the holding rings 18 and 20 are resiliently yielding due to the use of an elastic material, and are so dimensioned and arranged that the distance between them is slightly less than the diameter of balls 19. Upon loading of the balls, there is a small pressure on the balls, and an elastic part radial and part axial yielding of the holding rings 18 and 20, such that the open distance of the holding rings 18 and 20 from one another is enlarged and the balls 19 can slip into the race 21 of the outer ring 10. After the balls 19 with their larger diameters have passed between the holding rings 18 and 20, the distance between the holding rings 18 and 20 relative to one another is again reduced and the balls 19 are not able to fall accidently from the race 21.

Figure 5:
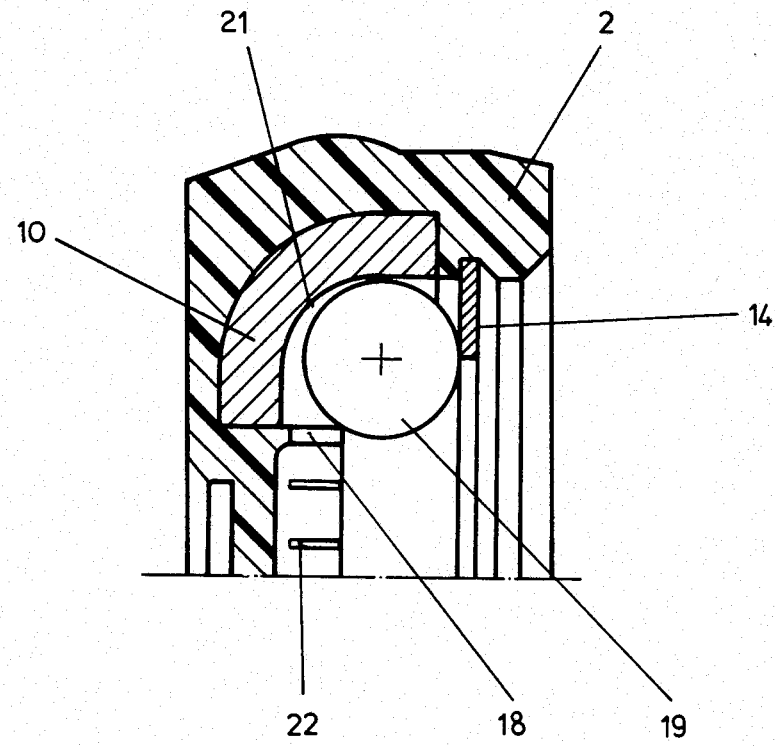
FIG. 5 is a cross-sectional view of the outer ring of an angular contact ball bearing with a holding ring and a sealing element, in accordance with the further embodiment of the invention.

In the outer ring 10 of an angular contact ball bearing as illustrated in FIG. 5, the radially inwardly holding ring is replaced by a sealing element such as annular seal 14. This holding ring 14 serves as a holder for the balls 19 in the axial direction in addition to serving as a seal. The axially directed holding ring 18 at the inside of the other side of the outer ring 10 has axially extending slits 22 distributed about its circumference, the slits extending from the face of the holding ring 18 away from the respective side of the jacket. The holding ring 18 is thereby divided in the circumferential direction, into individual ring sections, to improve the elastic holding action of the entire holding ring 18.

The illustrated and described embodiments are only examples of the invention. Thus, the specifically disclosed plastic jacket can be employed in combination, in principle, with any machine parts which must be automatically aligned. One specific use of this type is, for example, a bearing arrangement with friction bearings.

What is claimed is:

1. In a self aligning bearing structure wherein said bearing structure has an outer ring, and a plastic outer jacket is provided on said ring and adapted to be received in a bearing seat of a housing, said bearing seat being cylindrical, the improvement wherein said plastic outer jacket is of an elastically yielding plastic material and is fixedly connected to said outer ring, said plastic outer jacket having a single radially extending annular ridge in contact with said seat, said ridge being located at one axial portion thereof, said ridge having a larger outer diameter than the remainder of said jacket, and said ridge being compressed substantially to the compression limit of said plastic material between said outer ring and said cylindrical bearing seat.

2. The self aligning bearing structure of claim 1 wherein said plastic jacket has a conical portion adjoining said ridge and extending with diminishing diameter toward one side of said outer ring.

3. The self-aligning bearing structure of claim 1 wherein said plastic jacket engages at least one side surface of said outer ring at least in part.

4. The self aligning bearing structure of claim 3 wherein said bearing structure has an inner ring, said plastic jacket having a substantially radially inwardly directed lip positioned to form a seal with said inner ring.

5. The self aligning bearing structure of claim 3 wherein said plastic jacket has axially extending circumferentially distributed knobs on one side thereof.

6. The self aligning bearing structure of claim 1 wherein said plastic jacket extends axially beyond said outer ring on at least one side and has an annular groove on a radial inner surface thereof, and a sealing element fitted in said groove.

7. The self-aligning bearing structure of claim 1 wherein said plastic jacket is molded to said outer ring.

8. The self-aligning bearing of claim 1 wherein said plastic jacket is vulcanized to said outer ring.

9. The self-aligning bearing structure of claim 1 wherein said plastic jacket is glued to said outer ring.

10. The self-aligning bearing structure of claim 1 wherein said bearing structure is an angular contact ball bearing having at least one race formed of sheet metal.

11. The self-aligning bearing structure of claim 1 wherein said bearing structure has rolling elements engaging said outer ring, said plastic jacket having at least one elastic holding ring formed thereon, said holding ring projecting along at least one side of said outer ring and positioned to inhibit rolling elements from falling away from said outer ring.

12. The self-aligning bearing structure of claim 11 wherein said holding ring is spaced from said rolling elements in the assembled condition of said bearing structure.

13. A self-aligning bearing structure of claim 11 wherein said holding ring extends axially and radially inwardly of the adjacent portion of said outer ring, and has axially extending slits distributed about its circumference.

14. In a self-aligning bearing assembly wherein a first bearing has an outer ring with a plastic outer jacket thereon and a housing has a first bearing seat receiving said outer ring, the improvement wherein said plastic outer jacket is fixedly connected to said outer ring, said seat is cylindrical, and said plastic jacket has a single annular ridge that contacts said first bearing seat, said ridge extending radially therefrom along a portion of its axial length, said ridge having an outer diameter greater than the diameter of said first bearing seat, in the unassembled condition, whereby said ridge is compressed substantially to its compression limit between said outer ring and said first bearing seat.

15. The self-aligning bearing assembly of claim 14 wherein said ridge is centrally axially disposed on said jacket and said jacket has a conical section adjoining said ridge and extending with decreasing diameter toward one end of said first bearing.

16. The self-aligning bearing assembly of claim 14, further comprising a shaft supported by said first bearing, a second bearing seat in said housing spaced from said first bearing seat, and a second bearing supporting said shaft and having an outer ring fitted in said second bearing seat, the outer ring of said second bearing having a plastic jacket with an annular ridge of diameter greater, in the unassembled condition, than the diameter of said second bearing seat.

17. The self-aligning bearing assembly of claim 14 wherein said outer ring is an arcuate sheet metal ring having one end directed substantially axially and the other end directed substantially radially, said plastic jacket surrounding the radially outwardly directed sides of said outer ring.

* * * * *